United States Patent
Wang et al.

(10) Patent No.: US 10,681,355 B2
(45) Date of Patent: Jun. 9, 2020

(54) DESCRIBING METHOD AND CODING METHOD OF PANORAMIC VIDEO ROIS

(71) Applicant: PEKING UNIVERSITY SHENZHEN GRADUATE SCHOOL, Shenzhen (CN)

(72) Inventors: Zhenyu Wang, Shenzhen (CN); Ronggang Wang, Shenzhen (CN); Yueming Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/330,923

(22) PCT Filed: Jul. 12, 2017

(86) PCT No.: PCT/CN2017/092552
§ 371 (c)(1),
(2) Date: Mar. 6, 2019

(87) PCT Pub. No.: WO2018/072487
PCT Pub. Date: Apr. 26, 2018

(65) Prior Publication Data
US 2019/0253719 A1 Aug. 15, 2019

(30) Foreign Application Priority Data

Oct. 21, 2016 (CN) .......................... 2016 1 0921242
Oct. 26, 2016 (CN) .......................... 2016 1 0945845

(51) Int. Cl.
*H04N 19/167* (2014.01)
*H04N 19/146* (2014.01)
(Continued)

(52) U.S. Cl.
CPC ......... *H04N 19/167* (2014.11); *H04N 19/124* (2014.11); *H04N 19/146* (2014.11); *H04N 19/172* (2014.11); *H04N 19/176* (2014.11)

(58) Field of Classification Search
CPC ........ H04N 5/232; H04N 5/14; H04N 19/167; H04N 19/124; H04N 19/146; H04N 19/172; H04N 19/176
(Continued)

(56) References Cited

U.S. PATENT DOCUMENTS

2012/0092348 A1  4/2012  McCutchen
2016/0165309 A1  6/2016  Van Brandenburg et al.
(Continued)

FOREIGN PATENT DOCUMENTS

CN  104735464 A  6/2015
CN  105915907 A  8/2016
CN  106412582 A  2/2017

OTHER PUBLICATIONS

Sanchez, Y. et al., "Compressed Domain Video Processing for Tile Based Panoramic Streaming Using HEVC", 2015 IEEE International Conference on Image Processing (ICIP), Dec. 31, 2015.

*Primary Examiner* — Ayman A Abaza
(74) *Attorney, Agent, or Firm* — Miles & Stockbridge P.C.

(57) ABSTRACT

Disclosed are a describing method and a coding method of panoramic video ROIs based on multiple layers of spherical circumferences. The describing method comprises: first setting a center of the panoramic video ROIs; then setting the number of layers of ROIs as N; obtaining the size $R_n$ of the current layer ROI based on a radius or angle; obtaining the sizes of all of the N layers of ROIs, and writing information such as the center of the ROIs, the number of layers, and the size of each layer into a sequence header of a code stream. The coding method comprises adjusting or filtering an initial
(Continued)

QP based on a QP adjusted value and then coding an image. By flexibly assigning code rates to multiple layers of panoramic video ROIs, while guaranteeing a relatively high image quality of ROIs, the code rate needed for coding and transmission is greatly reduced.

10 Claims, 3 Drawing Sheets

(51) Int. Cl.
  *H04N 19/124* (2014.01)
  *H04N 19/172* (2014.01)
  *H04N 19/176* (2014.01)

(58) Field of Classification Search
  USPC .................................... 348/36–39, 42–61
  See application file for complete search history.

(56) References Cited

U.S. PATENT DOCUMENTS

| | | | |
|---|---|---|---|
| 2018/0077210 A1* | 3/2018 | Hannuksela | H04N 21/23439 |
| 2018/0176468 A1* | 6/2018 | Wang | H04N 19/46 |
| 2019/0200096 A1* | 6/2019 | Katsumata | H04N 21/816 |
| 2019/0304160 A1* | 10/2019 | Izumi | G06T 15/04 |

* cited by examiner

DESCRIBING METHOD AND CODING METHOD OF PANORAMIC VIDEO ROIS

CROSS-REFERENCE TO RELATED APPLICATIONS

The present application is a national stage filing under 35 U.S.C. § 371 of PCT/CN2017/092552, filed on Jul. 12, 2017 which claims priority to CN Application No. 201610921242.3 filed on Oct. 21, 2016 and CN Application No. 201610945845.7 filed on Oct. 26, 2016. The applications are incorporated herein by reference in their entirety.

FIELD

The present disclosure relates to the technical field of video coding and decoding, and more particularly relates to a describing method and a coding method of panoramic video ROIs (Regions of Interest) based on multiple layers of spherical circumferences.

BACKGROUND

Virtual reality (VR) technologies and relevant applications are currently developing expeditiously. Panoramic video is an important component in AIR technologies. Because the panoramic video records a whole footage in a 360° angle of view, it has an extremely large data size; therefore, compression of the panoramic video is a key technology in VR applications.

As mentioned above, the panoramic video records a whole footage in a 360° angle of view; however, an individual user can only view part of the panoramic video footage at a same time point. Conventional coding methods would indiscriminately code, with the same or similar quality, different regions of the panoramic video image into one code stream for transmission, which thus have very large redundancies. One feasible approach of removing the redundancies is to generate a plurality of code streams for coding the panoramic video, wherein different code streams focus on coding of different regions (i.e., regions of interest) of the panoramic video footage; and an individual code stream only codes the region of its own interest at a high quality and a high code rate, but codes other regions (Non-ROIs) at a low quality and a low code rate. According to this method, the individual code stream has a code rate far lower than a code stream has in the conventional coding methods but may still maintain a same coding quality for the region of its own interest, which greatly reduces the overhead of panoramic video transmission. However, existing description methods are inefficient, which cannot satisfy the requirements of effectively describing panoramic video ROIs and thus cannot correspondingly code the same.

SUMMARY

To overcome the drawbacks in the prior art, the present disclosure provides a describing method and an encoding method of panoramic video ROIs based on multiple layers of spherical circumferences, which enables reasonable description of panoramic video ROIs of an individual panoramic video code stream and an efficient assignment of a code rate thereto.

A core idea of the present disclosure is to write descriptive information of ROIs into a sequence header of an individual code stream, the descriptive information being the information of the current individual code stream, while different code streams have their own ROI descriptions. Based on multiple layers of spherical circumferences, a plurality of layers of ROIs with a same center are defined as a plurality of layers of circumferences which have a same center but different radii on a panoramic spherical surface that has a spherical radius being 1 unit, wherein the center and radii of the circumferences are all located on the panoramic spherical surface based on their definitions in the spherical geometry; coordinates of the center, the number of layers N of the circumferences, and the radii of respective layers of the circumferences are written into the sequence header of the code stream, thereby expressing the plurality of ROIs with the same center. The center of the ROIs is the center C of the circumferences on the panoramic spherical surface, coordinates of which center may be expressed by longitude-latitude $(C_x, C_y)$; a size of an ROI is expressed by a radius size R of a corresponding circumference on the panoramic spherical surface (wherein the radius size of the $n^{th}$ layer of circumference of interest is denoted as $R_n$); the value of the radius size of a circumference on the panoramic spherical surface is equal to a radian of an included angle between a connecting line connecting one end of the circumferential radius on the panoramic spherical surface and the spherical center and a connecting line connecting the other end of the circumferential radius on the panoramic spherical surface and the spherical center, such that the radius size of the circumference may also be expressed by an angle value corresponding to the radian. There are two methods of coding a panoramic video ROI. One method is to apply different QP adjusted values to image blocks at different layers of ROIs (the QP adjusted value for the $n^{th}$ layer is denoted as $\Delta QP_n$, and $\Delta QP_n \leq 0$), comprising: adding the QP adjusted value of a current image block to an initial QP value thereof obtained according to a conventional method so as to obtain an actual QP for coding the image block; based on a mapping manner of the current panoramic image and the coordinates, on the image, of a central point A of the current image block; computing longitude-latitude $(A_x, A_y)$ of the central point A on the panoramic spherical surface; based on the longitude-latitude $(A_x, A_y)$ and longitude-latitude $(C_x, C_y)$ of the center of the ROI, computing a spherical distance D between the point A and the point C, wherein the spherical distance D may also be expressed by an angle value corresponding to the radian. The other method of coding panoramic video ROIs comprises: firstly, computing a distance D' between a current point B on the panoramic spherical surface and the central point C of the ROI; determining a priority P of the point B based on the distance D'; selecting a filter template or a filter strength based on the D' and the P to low-pass filter the current point B; and finally coding the entire filtered image according to a conventional manner.

A technical solution of the present disclosure is provided below:

A describing method of panoramic video ROIs based on multiple layers of spherical circumferences, wherein the panoramic video ROIs are expressed based on multiple layers of circumferences on the panoramic spherical surface; assuming that the number of layers of the circumferences is N, a plurality of layers of ROIs with a same center are defined as a plurality of layers (N layers) of the circumferences which have a same center but different radii on the panoramic spherical surface that has a spherical radius being 1 unit; the coordinates of the center, the number of layers N of the circumferences, and the radii of respective layers of the circumferences are written into the sequence header of a code stream, thereby finalizing description of the multiple layers of panoramic video ROIs.

The above method of expressing multiple layers of panoramic video ROIs based on multiple layers of circumferences on the panoramic spherical surface comprises steps of:

A1) defining a spherical radius of the panoramic spherical surface to be 1 unit (e.g., the radius is 1), and defining the panoramic video ROIs as spherical areas surrounded by circumferences on the panoramic spherical surface;

A2) describing a center of a current ROI as longitude-latitude ($C_x$, $C_y$) of the panoramic spherical surface where a center of a corresponding circumference is located, wherein a size of the ROI is described by a radius of the circumference on the panoramic spherical surface.

In the present disclosure, a circumference refers to "a circumference on a panoramic spherical surface," which should use, in default, the definition of a circle in the spherical geometry. The circle center or radius mentioned herein should be understood according to the definitions in the spherical geometry. With the latitude circle at north latitude 60° of the earth as an example, in the spherical geometry, the center of this latitude circle is the north pole point, and the radius refers to a connecting line between any point on the north latitude 60° and the north pole point along the surface of the earth. However, according to the common Euclidean geometry, in a three-dimensional space, the center of the latitude circle at north latitude 60° is inside the earth and the radius is not on the earth surface. Therefore, where the center and radius of a circumference are mentioned in the present disclosure, they should refer to the center and radius on the "panoramic spherical surface."

In the spherical surface geometry, a circumference on the spherical surface refers to a shortest connecting line along the spherical surface between a point on the circumference and the circumference center on the spherical surface. This segment of connecting line is a segment of radian with respect to the sphere or from the perspective of a three-dimensional space.

Therefore, for the panoramic spherical surface with the spherical radius being 1 unit, the radius of a circumference on the panoramic spherical surface corresponds to a segment of radian, and the length of the radius is a radian of the angle between a connecting line between one end of the radius and the spherical center and a connecting line between the other end of the radius and the spherical center, such that an angle corresponding to the radian may also be used to express the size of the corresponding ROI.

N layers of circumferences with the same center but different radii may be used to describe N layers of ROIs with different priorities, wherein a region inside a circumference with the smallest radius has the highest priority, the region inside a circumference with the second smallest radius has the second priority, and so on, Multiple layers of ROIs may be expressed by this method above in the present disclosure, wherein the size of the $n^{th}$ layer of ROI is denoted as $R_n$. Information such as the ROI center, the number of layers, and the size of respective layers is written into a sequence header of a code stream.

Specifically, describing of the multiple layers of panoramic video ROIs comprises: first, setting longitude-latitude ($C_x$, $C_y$), on a panoramic spherical surface, of the center of circumferences on the panoramic spherical surface as the center of the corresponding panoramic video ROIs; then setting the number of layers of ROIs to N; setting an initial value n of a layer number counter=1; obtaining a size $R_n$ of the current layer of ROI according to the method above (a radius of the corresponding circumference on the panoramic spherical surface), till obtaining the sizes of all of the N layers of ROIs, and then writing information such as the center of the ROIs, the number of layers, and the sizes of respective layers into a sequence header of a code stream, thereby finalizing description of the multiple-layers of panoramic video ROIs.

Description of the panoramic video ROIs according to the describing method above may be coded by different methods to reduce the code rate of non-ROIs. The present disclosure provides a describing method of panoramic video ROIs based on multiple layers of spherical circumferences. In an embodiment of the present disclosure, the multiple layers of ROIs described according to the describing method above are coded by adjusting a quantization parameter (QP) value for each layer of ROI, which enables a flexible assignment of code rates to the multi-layers of panoramic video ROIs, comprising steps of:

B1) first, setting longitude-latitude ($C_x$, $C_y$) of a central point C of ROIs, the number of layers N, and the radius ($R_n$) of each layer; setting a QP (quantization parameter) adjusted value corresponding to each layer, where the QP adjusted value of the $n^{th}$ layer is denoted as $\Delta QP_n$, and $\Delta QP_n \leq 0$;

B2) when coding a current image block, based on the coordinates of a central point A of the current image block, computing longitude-latitude ($A_x$, $A_y$) of the central point A on the panoramic spherical surface, and computing a distance D between points A and C on the panoramic spherical surface; wherein for the panoramic spherical surface with a spherical radius defined as 1 unit, the spherical surface distance D between A and C is a radian of an angle between a connecting line between point A and a spherical center and a connecting line between point C and the spherical center, such that the distance D may also be expressed by the angle corresponding to the radian; if D is smaller than $R_1$, the QP adjusted value of the image block is $\Delta QP_1$; otherwise, if D is greater than $R_N$, the QP adjusted value of the image block is 0; or, if D is smaller than $R_n$ and greater than $R_{n-1}$ (n>1), the QP adjusted value of the image block is $\Delta QP_n$;

B3) performing a conventional code rate control operation on the current image block to obtain an initial QP of the current image block, for example, the QP specified for the current image may be directly used as the initial QP of the current image block;

B4) adding the QP adjusted value to the initial QP of the current image block to obtain a QP for coding the current image block;

B5) coding the current block according to a conventional coding method based on the obtained QP for coding the current image block; wherein the coding may adopt a currently common video coding standard, including: mpeg2, h264, ANTS, and latest generations of H265 and AVS2, etc.;

B6) performing cyclic operations of steps B2-B5 on all image blocks in the image till all image blocks in the image are completely coded.

Another embodiment of the present disclosure provides a further method of coding multiple layers of ROIs, comprising steps of:

C1) first, setting longitude-latitudes ($C_x$, $C_y$) of a central point C of the ROIs, the number of layers N, and the radius ($R_n$) of each layer;

C2) computing a distance between each point on an image and the central point C of a current ROI; defining the distance between a current point B and the point C as D'; and obtaining a priority of the point B; wherein If D' is smaller than $R_1$, the point B is located at the first layer of ROI, whose priority is defined to 1; otherwise, if D' is greater than $R_N$, the point B is located beyond the ROI, whose priority is defined as N+1; or, if D' is smaller than $R_n$ but greater than $R_{n-1}$ (n>1), the point B is in the $n^{th}$ layer ROI, whose priority is defined as n;

C3) determining a filter template and a filter strength based on the distance D' between the point B and the point C as well as the priority of the point B, and performing low-pass filter to the point B; and coding the filtered image according to a conventional coding method, wherein the filtered image may be coded using any existing encoder.

The existing video coding method generally performs coding in the following procedure: blocking the image and coding each block, wherein when coding the current block, the current block is firstly predicted to obtain a predicted block of the current block, and the predicted block may be obtained by predicting a pixel value of each pixel of the current block using pixel values of the images surrounding the current block or obtained by predicting the current image block using an image block on an already coded image; then, deducting the predicted block from the pixel value of the current block to obtain a residual block; afterwards, transforming the residual block to obtain a transformed block, and performing a quantization operation on the transformed block to obtain a quantized block; finally, writing the value of each point in the quantized block into the code stream.

Compared with the prior art, the present disclosure has the following beneficial effects:

The present disclosure provides a describing method and a coding method of panoramic video ROIs based on multiple layers of spherical circumferences, wherein the describing method expresses the panoramic video ROIs as the multiple layers of panoramic video ROIs based on multiple layers of circumferences on the panoramic spherical surface; the coding method may flexibly assign code rates to the multiple layers of panoramic video ROIs, such that while guaranteeing that the ROIs have a relatively high image quality, the technical solution of the present disclosure may greatly reduce the code rate needed for coding and transmission.

Figure 5:
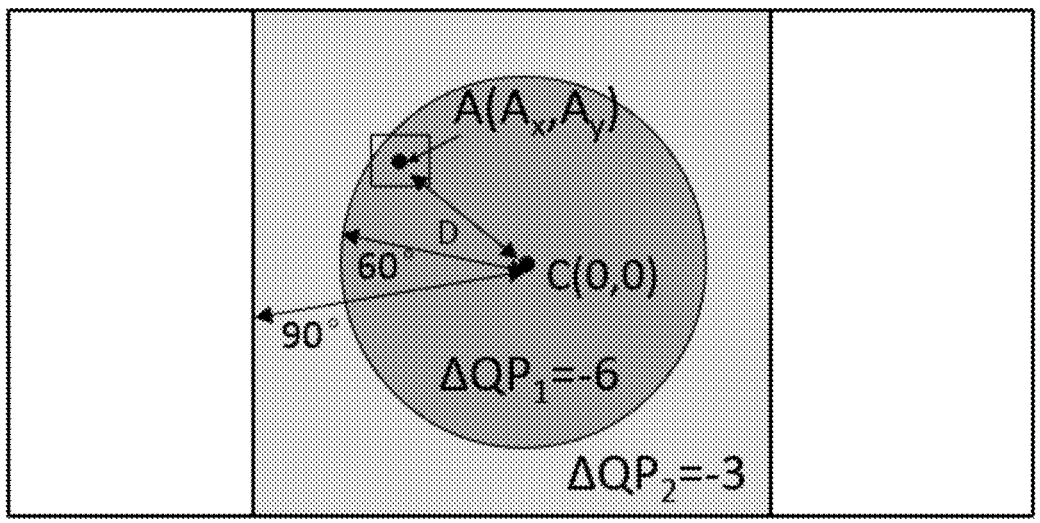

where (a)~(f) denote the ROIs, longitude-latitudes of ROI centers are (0, 0), (90, 0), (−90, 0), (180, 0), (0, 90) and (0, −90), respectively, and each ROI center defines two ROIs whose radii are 60° and 90°, respectively;

FIG. 5 shows a schematic diagram of describing a panoramic video ROI and expressing a set QP adjusted value in a first embodiment of the present disclosure;

where A is a point on the panoramic spherical surface, the longitude-latitude corresponding to the point is $(A_x, A_y)$; C is the center of the ROI, the longitude-latitude of the point C is (0, 0); D is the distance between points A and C on the panoramic spherical surface; $\Delta QP_1$ is the QP adjusted value of the image block.

Figure 6:
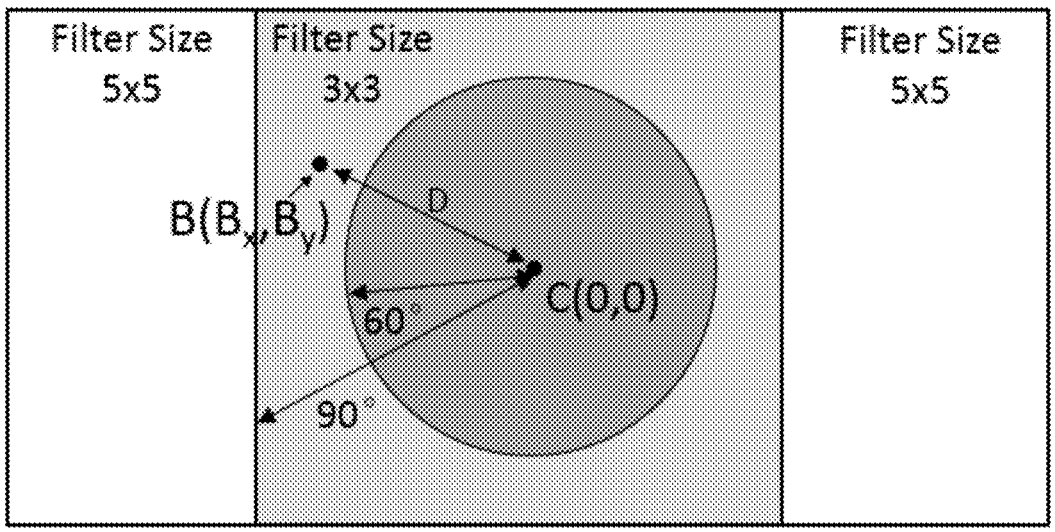

FIG. 6 shows a schematic diagram of describing a panoramic video ROI and expressing a set filter size in a second embodiment of the present disclosure;

where B is a point on the panoramic spherical surface, the longitude-latitude of the point corresponding to the panoramic spherical surface is $(B_x, B_y)$; C is the center of the ROI, the longitude-latitude of the point C is (0, 0); the Filter Size is the size of template used for performing Gaussian filtering to the point B, which is 3×3 or 5×5, respectively.

DETAILED DESCRIPTION OF EMBODIMENTS

Hereinafter, the present disclosure is further described through the embodiments, but the scope of the present disclosure is not limited in any manner.

The present disclosure provides a describing method and a coding method of panoramic video ROIs based on multiple layers of spherical circumferences and a method of coding the same. The describing method expresses the panoramic video ROIs as the multiple layers of panoramic video ROIs based on multiple layers of circumferences on the panoramic spherical surface; the coding method may flexibly assign code rates to the multiple layers of panoramic video ROIs; therefore, the technical solution of the present disclosure enables reasonable description of panoramic video ROIs of an individual panoramic video code stream and an efficient assignment of a code rate thereto.

The describing method of the panoramic video ROI comprises: firstly describing the panoramic video ROIs based on multiple layers of spherical circumferences; describing ROI centers using the longitude-latitudes of circumference centers on the panoramic surface;

describing the size of an ROI using the degree of an angle between a radius of a corresponding circumference on the panoramic spherical surface relative to the center of the sphere, wherein the ROIs with different priorities may be described using the circumferences having the same center but different radii. Information such as the centers of the ROIs, the number of layers, and the size of each layer is written into a sequence header of a code stream. The describing method of panoramic video ROIs comprises steps of:

A1) setting longitude-latitude $(C_x, C_y)$, on the panoramic spherical surface, of a center of circumferences on the panoramic spherical surface, as a center of the panoramic ROIs;

A2) further setting the number of layers of ROIs to N; setting an initial value of a layer number counter n=1;

A3) expressing a size of the current ROI by a radius of a corresponding circumference on the panoramic spherical surface; supposing the current layer is the $n^{th}$ layer, then denoting the current layer of ROI as $R_n$; adding 1 to the value of the layer number counter;

A4) cyclically executing the step 3) till obtaining the sizes of the ROI of all of the N layers;

A5) writing coordinates of the center of the panoramic video ROI, the number of layers N, and the radius of each layer of circumferences into a sequence header of a code stream, thereby completing description of the multi-layers of panoramic video ROIs.

The multi-layers of panoramic video ROIs may be described according to the method above, and description of the multi-layers of panoramic video ROIs may be coded using the following two coding methods.

The first method of coding panoramic video ROIs comprises: computing a distance between a central point of a to-be-encoded image block and a central point of the ROIs on the panoramic spherical surface; selecting a layer order of ROI where the image block is located based on the distance; and adjusting an initial QP value of the image block based on a corresponding QP adjusted value, thereby obtaining a final QP for coding; the second coding method comprises: computing a distance from each point in the image to a central point of the ROIs on the panoramic spherical surface, selecting a layer of ROI where the image block is located based on the distance; determining a filter template and a filter strength for the point based on the distance and the layer, filtering, and finally coding the image according to a conventional method.

Embodiment 1

Figure 1:
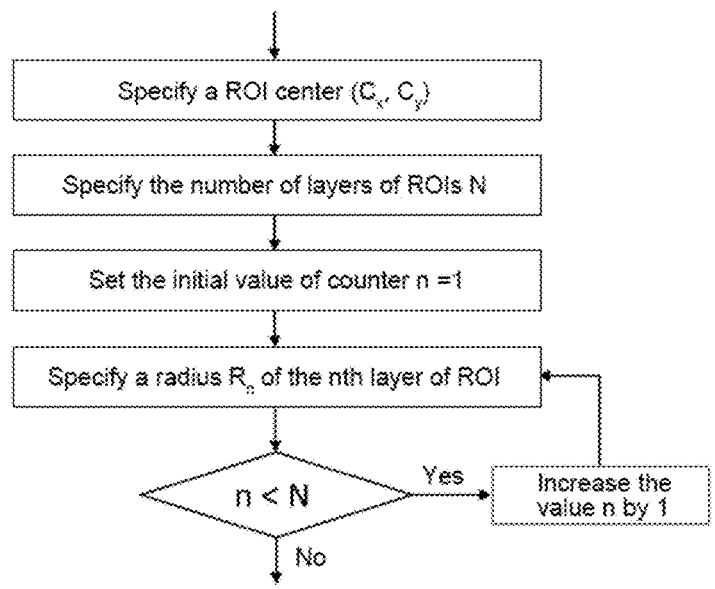
FIG. 1 shows a block diagram of a describing method of panoramic video ROIs provided according to the present disclosure.
Figure 2:
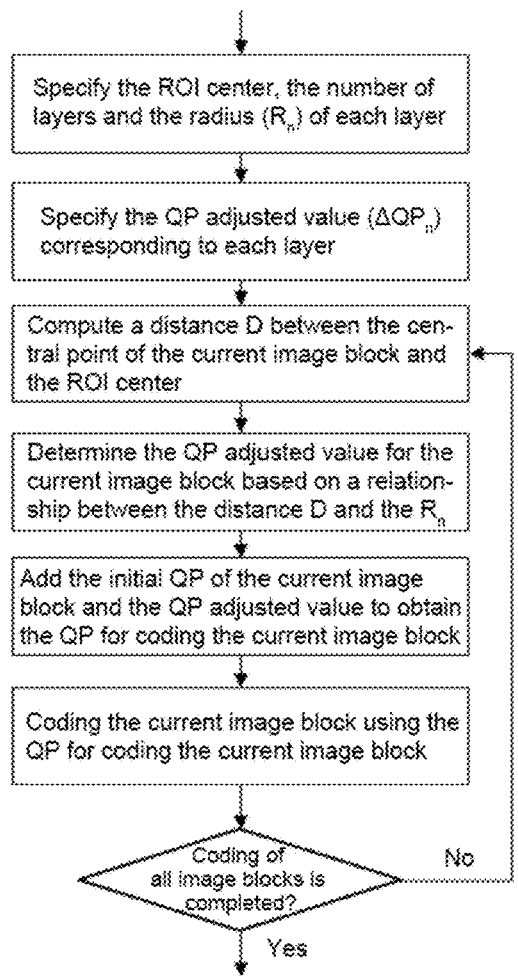
FIG. 2 shows a block diagram of a first method of coding panoramic video ROIs provided according to the present disclosure.
Figure 3:
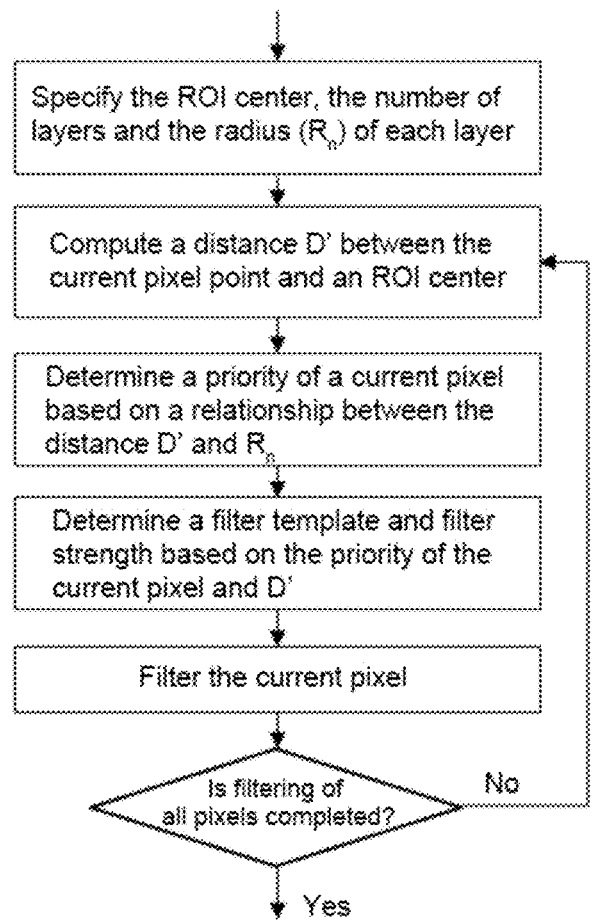
FIG. 3 shows a block diagram of a second method of coding panoramic video ROIs provided according to the present disclosure.
Figure 4:
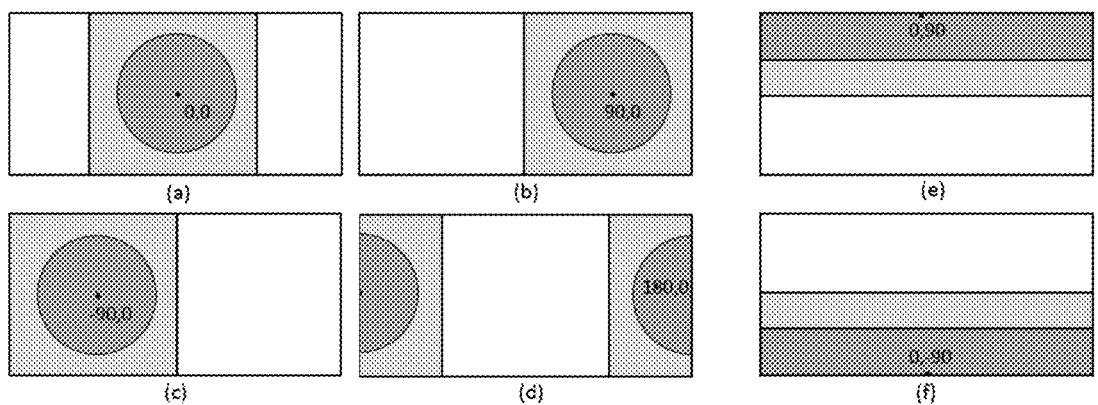
FIG. 4 shows a schematic diagram of partitioning panoramic video ROIs in an embodiment of the present disclosure.

The first embodiment adopts the describing method and the coding method of the panoramic video ROIs based on multiple layers of spherical circumferences provided by the present disclosure, ROI centers are defined to code a typical panoramic video mapped in a longitude-latitude map. In this embodiment, 6 ROI centers are defined. As shown in FIG. 4, (a)~(f) represent the ROIs, the longitude-latitudes of the centers of which are (0, 0), (90, 0), (−90, 0), (180, 0), (0, 90) and (0, −90), respectively; and each ROI center defines two ROIs with radii being 60° and 90°, respectively. Therefore, to code the panoramic video, 6 code streams may be generated based on the partitions in FIG. 4(a)~(f).

Corresponding to the code stream of FIG. 4(a), as shown in FIG. 5, it is needed to write information such as the longitude-latitude (0, 0) of the central point C of the ROIs, the number of layers of ROIs (2 layers), the size of the first layer of ROI (60°), and the size of the second layer of ROI (90°) into a sequence header; code the code stream, controlled using a code rate of a fixed image block QP, and set an initial QP of each image block to $QP_{Base}$; when coding a certain image block, as shown in FIG. 5, based on coordinates of the central point A of the image block on the image, compute corresponding longitude-latitude $(A_x, A_y)$ of the central point A on a panoramic spherical surface, and based on the longitude-latitude $(A_x, A_y)$ of point A and the longitude-latitude (0, 0) of the central point C of the ROI, compute a distance D between points A and C on the panoramic spherical surface, wherein if D is smaller than the size of the first layer of the ROI (60°), the QP adjusted value ($\Delta QP_1$) of the image block is −6; otherwise, if the value of D is between 60° and 90°, the QP adjusted value ($\Delta QP_2$) of the image block is −3; otherwise, the QP adjusted value of the image block is 0; finally, the QP for coding the image block should be $QP_{Base}$ plus the QP adjusted value of the image block.

Corresponding to the code stream in FIG. 4(b), it is needed to write information such as the longitude-latitude (90, 0) of the central point of the ROIs, the number of layers of ROIs (2 layers), the size (60°) of the first layer of ROI, and the size (90°) of the second layer of ROI into the sequence header; the remaining coding operations are identical to the code stream corresponding to FIG. 4(a).

Corresponding to the code streams in FIGS. 4(c)~(f), information such as the longitude-latitude of the central point of respective ROI, the number of layers of respective ROI, the size (60°) of respective layer of ROI is written into the sequence header, and then coding according to the same method as shown in FIGS. 4(a) and 4(b).

Embodiment II

In this embodiment, 6 ROI centers are defined to code a typical panoramic video mapped in a longitude-latitude map. As shown in FIG. 4, (a)~(f) represent the ROIs, the longitude-latitudes of the centers of which are (0, 0), (90, 0), (−90, 0), (180, 0), (0, 90) and (0, −90), respectively. Each center of the ROI defines two ROI whose two radii are 60° and 90°, respectively. Therefore, to code the panoramic video, 6 code streams may be generated based on the partitions in FIG. 4(a)~(f).

Corresponding to the code stream of FIG. 4(a), as shown in FIG. 6, it is needed to write information such as the longitude-latitude (0, 0) of the central point C of the ROIs, the number of layers of ROIs (2 layers), the size of the first layer of ROI (60°), and the size of the second layer of ROI (90°) into a sequence header; as shown in FIG. 6, compute a distance from each point to the central point C of the ROIs; based on the coordinates of the current point B on the image, compute longitude-latitude $(B_x, B_y)$ corresponding to the point on the panoramic spherical surface, and based on the longitude-latitude $(B_x, B_y)$ of the point B and the longitude-latitude (0, 0) of the central point C of the ROIs, compute a distance D' between point B and point C on the panoramic spherical surface; wherein if D' is smaller than the size of the first layer of ROI (60°), the point B is not filtered; otherwise; if the value of D' is between 60° and 90°, the point B is subjected to a Gaussian filter with the Filter Size of 3×3; or the Gaussian filter with the Filter Size of 5×5 is applied to the point; finally, coding is performed according to a conventional method.

For the code stream corresponding to FIG. 4(b), it is needed to write information such as the longitude-latitude (90, 0) of the central point of the ROIs, the number of layers of ROIs (2 layers), the size (60°) of the first layer of ROI, and the size (90°) of the ROI of the second layer into the sequence header; the remaining operations are identical to the code stream corresponding to FIG. 4(a).

For the code streams corresponding to FIGS. 4(c)~(f), information such as the longitude-latitude of the central point of respective ROI, the number of layers of respective ROI, the size (60°) of respective layer of ROI is written into the sequence header; the operations are identical to the methods used on FIGS. 4(a) and 4(b).

In view of the above, the present disclosure expresses panorama image ROIs as multiple layers of panoramic video ROIs based on multiple layers of circumferences on a panoramic spherical surface; the coding method may flexibly assign code rates to the multiple layers of panoramic video ROIs; while guaranteeing that the ROIs have a relatively high image quality, the technical solution of the present disclosure may greatly reduce the code rate required for coding and transmission.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. A describing method of panoramic video ROIs based on multiple layers of spherical circumferences comprising:
    expressing the panoramic video ROIs based on multiple layers of circumferences on a panoramic spherical surface of a sphere;
    wherein a number of layers of the circumferences is set as N; a plurality of layers of ROIs with a same center are defined as a plurality of layers (N layers) of the circumferences which have the same center but different radii on the panoramic spherical surface of the sphere and the sphere has a spherical radius being 1 unit; and coordinates of the center, the number of layers N of the circumferences, and the radii of respective layers of the circumferences are written into a sequence header of a code stream, thereby finalizing description of the multiple layers of panoramic video ROIs.

2. The describing method of panoramic video ROIs according to claim 1, comprising steps of:
A1) setting longitude-latitude ($C_x$, $C_y$), on the panoramic spherical surface, of a center of circumferences on the panoramic spherical surface, as a center of the panoramic video ROIs;
A2) further setting the number of layers of ROIs to N; and setting an initial value of a layer number counter n=1;
A3) expressing a size of a current ROI by a radius of a corresponding circumference on the panoramic spherical surface; supposing a current layer is the $n^{th}$ layer, then denoting the current layer of the current ROI as $R_n$; and adding 1 to the value of the layer number counter;
A4) cyclically executing the step 3) till obtaining the sizes of the ROIs of all of the N layers; and
A5) writing coordinates of the center of the panoramic video ROIs, the number of layers N, and radius of each layer of circumferences into a sequence header of a code stream, thereby completing description of the multiple layers of panoramic video ROIs.

3. The describing method of the panoramic video ROIs according to claim 2, wherein in step A3), the size of the current ROI is expressed as a radian of an angle between a first connecting line that connects one end of a radius of a corresponding circumference on the panoramic spherical surface and a spherical center of the sphere and a second connecting line that connects the other end of the radius of the corresponding circumference on the panoramic spherical surface and the spherical center.

4. A coding method of panoramic video ROIs, wherein to code multiple layers of panoramic video ROIs obtained from a description according to a describing method of panoramic video ROIs, different QP adjusted values are applied to image blocks located at different layers of ROIs, wherein a QP adjusted value for a $n^{th}$ layer is denoted as $\Delta QP_n$, and $\Delta QP_n \leq 0$, and the coding method comprises:
adding a QP adjusted value to a QP initial value of a current image block obtained according to a conventional method, thereby obtaining an actual QP for coding the current image block; and
based on the actual QP for coding the current image block, coding the current image block according to a flow of an existing coding method;
wherein the describing method of panoramic video ROIs based on multiple layers of spherical circumferences comprises expressing the panoramic video ROIs based on multiple layers of circumferences on a panoramic spherical surface of a sphere;
wherein a number of layers of the circumferences is set as N; a plurality of layers of ROIs with a same center are defined as a plurality of layers (N layers) of the circumferences which have a same center but different radii on the panoramic spherical surface of the sphere and the sphere has a spherical radius being 1 unit; coordinates of the center, the number of layers N of the circumferences, and the radii of respective layers of the circumferences are written into a sequence header of a code stream, thereby finalizing description of the multiple layers of panoramic video ROIs.

5. The coding method according to claim 4, wherein the flow of the existing coding method comprises:
blocking the image and then coding each block,
wherein when coding a current block, performing a coding process comprising:
firstly predicting a current block, thereby obtaining a predicted block of the current block;
subsequently deducting the predicted block from a pixel value of the current block, thereby obtaining a residual block;
transforming the residual block into a transformed block, and performing a quantization operation on the transformed block, thereby obtaining a quantized block; and
writing a value of each point in the quantized block into the code stream;
wherein when the coding process is completely performed on each block, coding of the image is finalized.

6. The coding method according to claim 4, wherein the QP adjusted value is obtained based on the following manner: if a distance D between a center of the current image block and a center of a ROI is smaller than $R_1$, the QP adjusted value of the image block is $\Delta QP_1$; otherwise, if D is greater than $R_N$, the QP adjusted value of the image block is 0; or, if D is smaller than $R_n$, and greater than $R_{n-1}$ (n>1), the QP adjusted value of the image block is $\Delta QP_n$.

7. The coding method according to claim 6, wherein the distance D between a center of the current image block and a center of a ROI is obtained by: based on a mapping manner of a current panoramic image and coordinates, on the image, of a central point A of the current image block, computing longitude-latitude ($A_x$, $A_y$) of the central point A on the panoramic spherical surface; and based on the longitude-latitude ($A_x$, $A_y$) and longitude-latitude ($C_x$, $C_y$) of the center of the ROI (point C), computing a spherical distance D between the point A and the point C.

8. The coding method according to claim 7, wherein the spherical distance D between the central point A and the point C is equal to a radian, on the panoramic spherical surface, of an angle between a connecting line between the central point A and a spherical center of the sphere and a connecting line between point C and the spherical center, such that the spherical distance D may also be expressed using a value of angle corresponding to the radian.

9. A method of coding panoramic video ROIs, wherein to code multiple layers of panoramic video ROIs obtained from description according to a describing method of panoramic video ROIs, the coding method comprises:
first computing a distance between each point on a panoramic spherical surface and a central point C of the ROIs; setting a current point in an image as B; computing to obtain a distance D' between a current point B and the central point C; then determining a priority P of the current point B based on the distance D'; selecting a filter template or filter strength based on the distance D' and the priority P; performing low-pass filter to the current point B; and finally coding a whole filtered image;
wherein the describing method of panoramic video ROIs based on multiple layers of spherical circumferences comprises expressing the panoramic video ROIs based on multiple layers of circumferences on the panoramic spherical surface of a sphere; and
wherein a number of layers of the circumferences is set as N; a plurality of layers of ROIs with a same center are defined as a plurality of layers (N layers) of the circumferences which have the same center but different radii on the panoramic spherical surface of the sphere and the sphere has a spherical radius being 1 unit; coordinates of the center, the number of layers N of the circumferences, and the radii of respective layers of the circumferences are written into a sequence header of a code stream, thereby finalizing description of the multiple layers of panoramic video ROI.

10. The coding method according to claim 9, wherein the priority P is obtained based on the following manner: if a distance D' between a center of a current image and the center of the ROIs is smaller than $R_1$, the priority P of the current point B is 1; otherwise, if D' is greater than $R_N$, the priority P of the current point B is N+1; or, if D' is smaller than $R_n$ and greater than $R_{n-1}$(n>1), the priority P of the current point B is n.

* * * * *